United States Patent
Katoh et al.

(10) Patent No.: US 9,727,662 B2
(45) Date of Patent: *Aug. 8, 2017

(54) DATA OUTPUT METHOD, COMPUTER-READABLE RECORDING MEDIUM STORING DATA OUTPUT PROGRAM AND DATA OUTPUT SYSTEM

(71) Applicant: FUJITSU LIMITED, Kawasaki-shi, Kanagawa (JP)

(72) Inventors: Takashi Katoh, Yokohama (JP); Shinichiro Tago, Shinagawa (JP); Tatsuya Asai, Kawasaki (JP); Hiroaki Morikawa, Kawasaki (JP); Junichi Shigezumi, Kawasaki (JP); Hiroya Inakoshi, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 346 days.

This patent is subject to a terminal disclaimer.

(21) Appl. No.: 14/308,738

(22) Filed: Jun. 19, 2014

(65) Prior Publication Data

US 2015/0026217 A1 Jan. 22, 2015

(30) Foreign Application Priority Data

Jul. 16, 2013 (JP) .................................. 2013-147970

(51) Int. Cl.
G06F 7/00 (2006.01)
G06F 17/30 (2006.01)

(52) U.S. Cl.
CPC .............................. *G06F 17/30958* (2013.01)

(58) Field of Classification Search
CPC .......................... G06F 17/30958; G06T 11/206

(Continued)

(56) References Cited

U.S. PATENT DOCUMENTS

| | | | | |
|---|---|---|---|---|
| 5,201,046 A | * | 4/1993 | Goldberg | .......... G06F 17/30595 |
| 6,092,064 A | * | 7/2000 | Aggarwal | ......... G06F 17/30327 |
| | | | | 707/694 |
| 2001/0007987 A1 | | 7/2001 | Igata | |
| 2001/0042059 A1 | * | 11/2001 | Uehara | .............. G06F 17/30595 |
| 2002/0004710 A1 | * | 1/2002 | Murao | .................. G06T 17/005 |
| | | | | 702/167 |
| 2008/0235193 A1 | * | 9/2008 | Hattori | .............. G06F 17/30935 |
| 2009/0259652 A1 | * | 10/2009 | Yamane | ............ G06F 17/30598 |
| 2010/0082762 A1 | * | 4/2010 | Hotta | ..................... G06Q 30/06 |
| | | | | 709/207 |
| 2011/0004631 A1 | | 1/2011 | Inokuchi et al. | |
| 2011/0307511 A1 | * | 12/2011 | Asai | .................. G06F 17/30926 |
| | | | | 707/769 |

(Continued)

FOREIGN PATENT DOCUMENTS

JP 2001-167087 6/2001
JP 2003-345821 12/2003

(Continued)

OTHER PUBLICATIONS

Office Action mailed Jun. 6, 2016 in related U.S. Appl. No. 14/283,295.

(Continued)

*Primary Examiner* — Binh V Ho
(74) *Attorney, Agent, or Firm* — Staas & Halsey LLP

(57) ABSTRACT

A data output method includes: generating, by a computer, (n−1) first conditions (n is an integer number of three or more) on a relationship between two data by dividing, in a sequential order, a common element condition in which an attribute of each of n data includes a common element, the attribute of each of the two data including the common element; extracting first data corresponding to each of n data to set the first data as a node under a condition; creating a first graph in which nodes are coupled with links based on the first condition; creating a second graph by repeatedly performing a first process, a second process and a third process; determining candidates of a combination of data from the second graph; and outputting a combination of data satisfying the common element condition from the candidates of a combination of data.

12 Claims, 18 Drawing Sheets

(58) Field of Classification Search
USPC .......................................................... 707/798
See application file for complete search history.

(56) References Cited

U.S. PATENT DOCUMENTS

| | | |
|---|---|---|
| 2012/0150873 A1 | 6/2012 | Tokai |
| 2012/0293542 A1* | 11/2012 | Iwama .................. G06T 11/206 345/619 |
| 2014/0324503 A1* | 10/2014 | Whittaker .......... G06Q 10/1095 705/7.19 |
| 2015/0186457 A1* | 7/2015 | Enomoto .......... G06F 17/30424 707/769 |

FOREIGN PATENT DOCUMENTS

| | | |
|---|---|---|
| JP | 2009-176072 | 8/2009 |
| JP | 2009-205269 | 9/2009 |
| JP | 2009-208904 | 9/2009 |
| JP | 2010-152748 | 7/2010 |
| JP | 2011-128748 | 6/2011 |
| JP | 2012-58835 | 3/2012 |

OTHER PUBLICATIONS

U.S. Appl. No. 14/283,295, filed May 21, 2014, Takashi Katoh, Fujitsu Limited.
Final Office Action mailed Dec. 15, 2016 in co-pending U.S. Appl. No. 14/283,295.

* cited by examiner

FIG. 5A

```
<RETRIEVAL CONDITION>
(1) TYPE OF X IS CPU
(2) TYPE OF Y IS MEM
(3) TYPE OF Z IS HDD
(4) MANUFACTURERS OF X AND Y ARE THE SAME
(5) THERE IS A COMMON PLACE IN MANUFACTURING
    BASES BETWEEN X, Y AND Z
```

FIG. 5B

```
<RETRIEVAL CONDITION>
(1) TYPE OF X IS CPU              ⎫
(2) TYPE OF Y IS MEM              ⎬ UNARY CONDITION
(3) TYPE OF Z IS HDD              ⎭
(4) MANUFACTURERS OF X AND Y ARE THE SAME   } BINARY CONDITION
(5) THERE IS A COMMON PLACE IN MANUFACTURING } TERNARY CONDITION
    BASES BETWEEN X, Y AND Z                 (COMMON ELEMENT
                                              CONDITION)
```

FIG. 6

```
<RETRIEVAL CONDITION>
(1) TYPE OF X IS CPU
(2) TYPE OF Y IS MEM                              } UNARY CONDITION
(3) TYPE OF Z IS HDD
(4) MANUFACTURERS OF X AND Y ARE THE SAME         } BINARY CONDITION
(5) THERE IS A COMMON PLACE IN MANUFACTURING
    BASES BETWEEN X, Y AND Z
        · COMMONNESS (X-Y MANUFACTURING BASE)     } COMMON ELEMENT
        · COMMONNESS (Y-Z MANUFACTURING BASE)       CONDITION
```

FIG. 7

| ID | TYPE | MANUFACTURER | MANUFACTURING BASE |
|----|------|--------------|---------------------|
| 1 | HDD | C CO. | TOHOKU,CHUBU,KYUSHU |
| 2 | CPU | A CO. | KANTO,CHUBU |
| 3 | MEM | B CO. | TOHOKU,KYUSHU |
| 4 | MEM | C CO. | TOHOKU,KANTO,CHUBU |
| 5 | HDD | A CO. | KANTO,KINKI |
| 6 | CPU | B CO. | CHUBU,KYUSHU |
| 7 | HDD | A CO. | TOHOKU,CHUBU |
| 8 | MEM | A CO. | TOHOKU,KINKI,KYUSHU |

```
<RETRIEVAL CONDITION>
(1) TYPE OF X IS CPU
(2) TYPE OF Y IS MEM
(3) TYPE OF Z IS HDD
(4) MANUFACTURERS OF X AND Y ARE THE SAME
(5) THERE IS A COMMON PLACE IN MANUFACTURING
    BASES BETWEEN X, Y AND Z
       · COMMONNESS (X-Y MANUFACTURING BASE)
       · COMMONNESS (Y-Z MANUFACTURING BASE)
```

RETRIVAL RESULT
(x,y,z)=(6,3,1)

DATA OUTPUT METHOD, COMPUTER-READABLE RECORDING MEDIUM STORING DATA OUTPUT PROGRAM AND DATA OUTPUT SYSTEM

CROSS-REFERENCE TO RELATED APPLICATION

This application is based upon and claims the benefit of priority from the prior Japanese Patent Application No. 2013-147970 filed on Jul. 16, 2013, the entire contents of which are incorporated herein by reference.

FIELD

Exemplary embodiments of the present disclosure are related to a data output method, a computer-readable recording medium having stored therein the data output program and a data output system.

BACKGROUND

When a data combination satisfying a predetermined condition is retrieved from a set of data, all data combinations are created from the set of data and the data combination satisfying the predetermined condition is found from the created data combinations, and is output.

Related techniques are disclosed in, for example, Japanese Laid-Open Patent Publication No. 2001-167087, Japanese Laid-Open Patent Publication No. 2011-128748, or Japanese Laid-Open Patent Publication No. 2009-176072.

SUMMARY

A data output method includes: generating, by a computer, (n−1) first conditions (n is an integer number of three or more) on a relationship between two data by dividing, in a sequential order, a common element condition in which an attribute of each of n data includes a common element, the attribute of each of the two data including the common element; extracting first data corresponding to each of n data to set the first data as a node under a condition; creating a first graph in which nodes are coupled with links based on the first condition; creating a second graph by repeatedly performing a first process, a second process and a third process, a first set of elements having a likelihood of satisfying the first condition among elements included in the attribute of the nodes being obtained regarding one direction of the sequential order in the first process, a second set of elements having a likelihood of satisfying the first condition among the elements being obtained regarding the other direction of the sequential order in the second process, a node that does not have an element common to the first set and the second set being deleted from the first graph in the third process; determining candidates of a combination of data from the second graph; and outputting a combination of data satisfying the common element condition from the candidates of a combination of data.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5A and FIG. 5B illustrate an example of retrieval conditions.

FIG. 6 illustrates an example of a retrieval condition after conversion.

FIG. 7 illustrates an example of data.

DESCRIPTION OF EMBODIMENTS

A technique to retrieve a structured document includes, for example, a method using a tree structure and a data analysis method using a graph created according to a graph theory.

In data retrieval, a combination of data satisfying a common element condition that a common element exists in attributes of n (n is an integer number of 3 (three) or more) data may be retrieved from multiple data. When a verification is performed in the retrieval as to whether all data combinations satisfies the common element condition, it may take time for a retrieval process to complete the verification.

Figure 1:
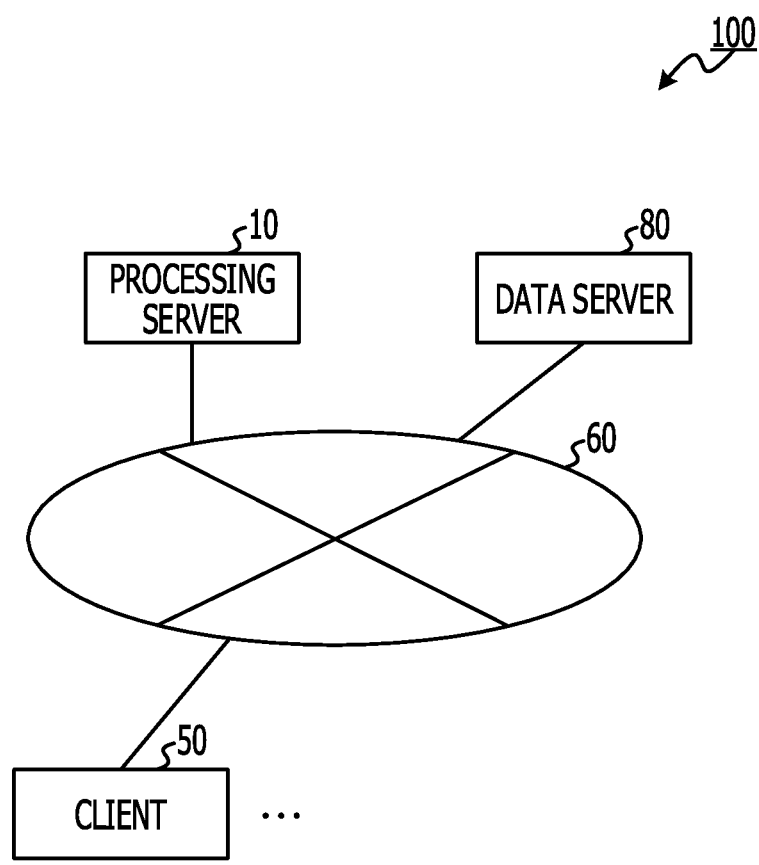
FIG. 1 illustrates an example of a data retrieval system.

FIG. 1 illustrates an example of a data retrieval system. As illustrated in FIG. 1, the data retrieval system 100 includes a processing server 10, a client 50 and a data server 80. The processing server 10, the client 50 and the data server 80 are coupled to a network 60 such as the Internet, or the Local Area Network (LAN). In the data retrieval system 100, the processing server 10 retrieves a combination of data that matches retrieval conditions from data in the data server 80, based on retrieval conditions of data input from the client 50, for example, conditions on the combination of data, and outputs the retrieved combination of data to the client 50. The data retrieval system 100 may be used, for example, in order to find an abnormality in a database, deploy personnel or procure parts, or perform a batch processing including a join. The batch processing may be a general batch processing.

Figure 2A:
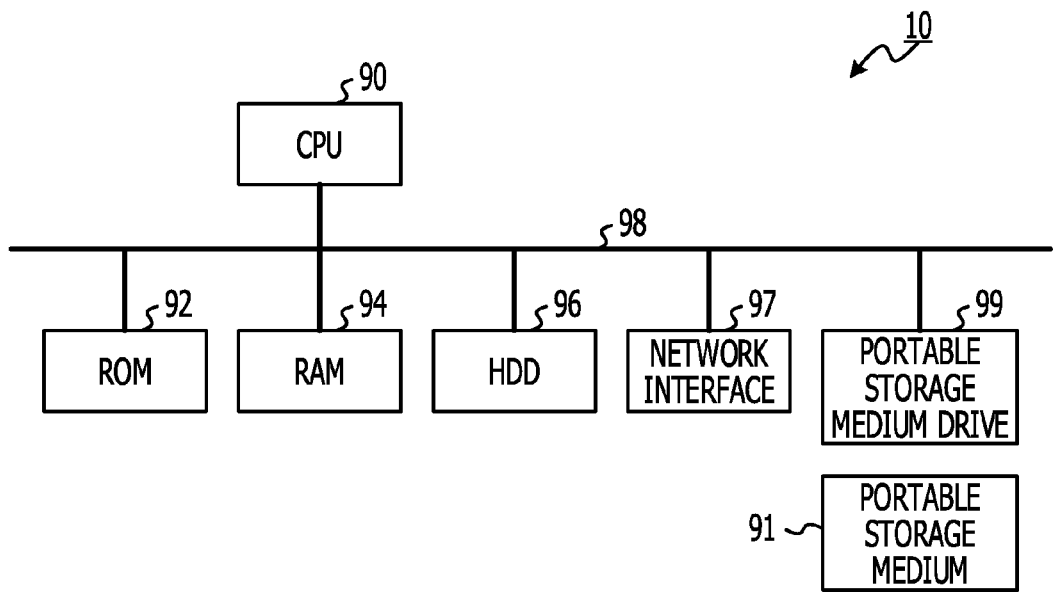
FIG. 2A illustrates an example of a hardware configuration of a processing server.
Figure 2B:
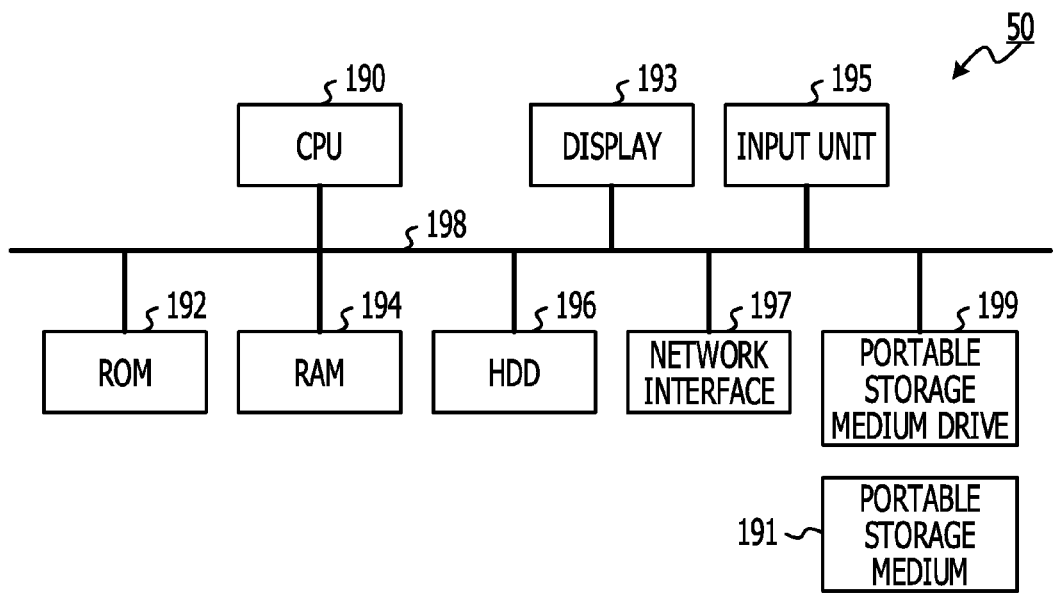
FIG. 2B illustrates an example of a hardware configuration of a client.
Figure 3:
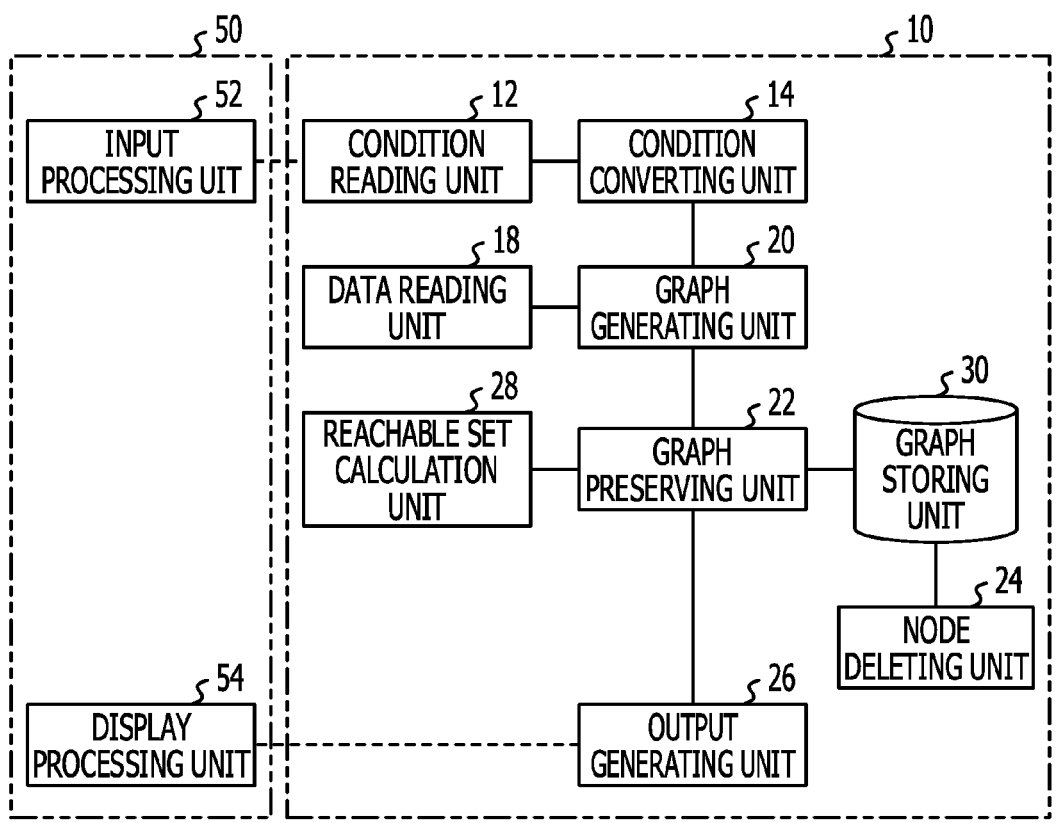
FIG. 3 illustrates an example of functional blocks of a processing server and a client.

FIG. 1 illustrates an example of a data retrieval system. FIG. 2A illustrates an example of a hardware configuration of a processing server. FIG. 2B illustrates an example of a hardware configuration of a client. FIG. 3 illustrates an example of functional blocks of a processing server and a client. A processing server 10 illustrated in FIG. 2A may be the processing server 10 illustrated in FIG. 1. The processing server 10 illustrated in FIG. 2A includes a CPU 90, a ROM 92, a RAM 94, a storage unit, for example, a HDD (Hard Disk Drive) 96, a network interface 97, and a portable storage medium drive 99. These components of the processing server 10 are each coupled to a bus 98. In the processing server 10, the CPU 90 may execute programs stored in the ROM 92 or the HDD 96 (data output programs) or programs read by the portable storage medium drive 99 from a portable storage medium 91 (data output programs) so as to implement functions of various components illustrated in FIG. 3.

A client 50 illustrated in FIG. 2B may be the client 50 illustrated in FIG. 1. The client 50 illustrated in FIG. 2B includes, for example, a CPU 190, a ROM 192, a RAM 194, a storage unit (HDD) 196, a network interface 197, a portable storage medium drive 199, a display 193, and an input unit 195. These components of the client 50 are each coupled to a bus 198. The display 193 may be a liquid crystal display and the input unit 195 may include, for example, a keyboard or a mouse. In the client 50, the CPU 190 may execute programs stored in the ROM 192 or the HDD 196 or programs read by the portable storage medium drive 199 from a portable storage medium 191 so as to implement functions of various components illustrated in FIG. 3.

A client 50 illustrated in FIG. 3 may be the client 50 illustrated in FIG. 1 or FIG. 2A and a processing server 10 illustrated in FIG. 3 may be the processing server illustrated in FIG. 1 or FIG. 2B.

As illustrated in FIG. 3, the client 50 includes an input processing unit 52 and a display processing unit 54. The input processing unit 52 transmits information, which is input from the input unit 195, for example, a user of the client 50, to the processing server 10. The display processing unit 54 displays the information on the display 193 based on an instruction from the processing server 10.

The processing server 10 illustrated in FIG. 3 includes a condition reading unit 12, a condition converting unit 14, a data reading unit 18, a graph generating unit 20, a graph preserving unit 22, a reachable set calculation unit 28, a node deleting unit 24 and an output generating unit 26.

The condition reading unit 12 reads a retrieval condition of data input from the client 50, for example, the input processing unit 52, and inputs the read retrieval condition to the condition converting unit 14. When the common element condition exists among the retrieval conditions of data input from the conditions reading unit 12, the condition converting unit 14 converts the common element condition. The condition converting unit 14 inputs each of a condition after conversion and a condition which is not required to be converted to the graph generating unit 20.

The data reading unit 18 reads a set of data to be retrieved, for example, a set of events or records, from the data server 80 and inputs the read set of data to the graph generating unit 20. The graph generating unit 20 uses the data input from the data reading unit 18 and the condition input from the condition converting unit 14 to generate a graph with nodes and links based on a graph theory. The graph generating unit 20 inputs the generated graph to the graph preserving unit 22.

The reachable set calculation unit 28 calculates the reachable set of each node using the graph generated in the graph generating unit 20 and inputs the calculated reachable set in the graph preserving unit 22.

The graph preserving unit 22 stores the graph input from the graph generating unit 20 and the reachable set input from the reachable set calculation unit 28 in the graph storing unit 30. The node deleting unit 24 verifies the graph and the reachable set stored in the graph storing unit 30 and deletes unnecessary nodes from the graph.

The output generating unit 26 reads the graph processed by the node deleting unit 24 from the graph storing unit 30 and determines a combination candidate of data satisfying the retrieval conditions from the read graph. The output generating unit 26 compares the combination candidate and the retrieval condition and outputs a combination of data satisfying the retrieval conditions to the client 50 (the display processing unit 54).

The data server 80 illustrated in FIG. 1 stores various types of data. FIG. 7 illustrates an example of data. The data illustrated in FIG. 7 may be data read by the data reading unit. For example, a database illustrated in FIG. 7 may be stored in the data server 80. The database illustrated in FIG. 7 may be a database in which a manufacturer of parts such as a HDD, CPU, and MEM (memory) and a manufacturing base are stored, or may include fields for "ID", "Type", "Manufacturer", and "Manufacturing base", for example. The serial number of data is stored in the "ID" field and the part name is stored in the "Type" field. The name of manufacturer manufacturing parts is stored in the "Manufacturer" field and the location of factory (workplace) at which parts are manufactured is stored in the "Manufacturing base" field.

Figure 4:
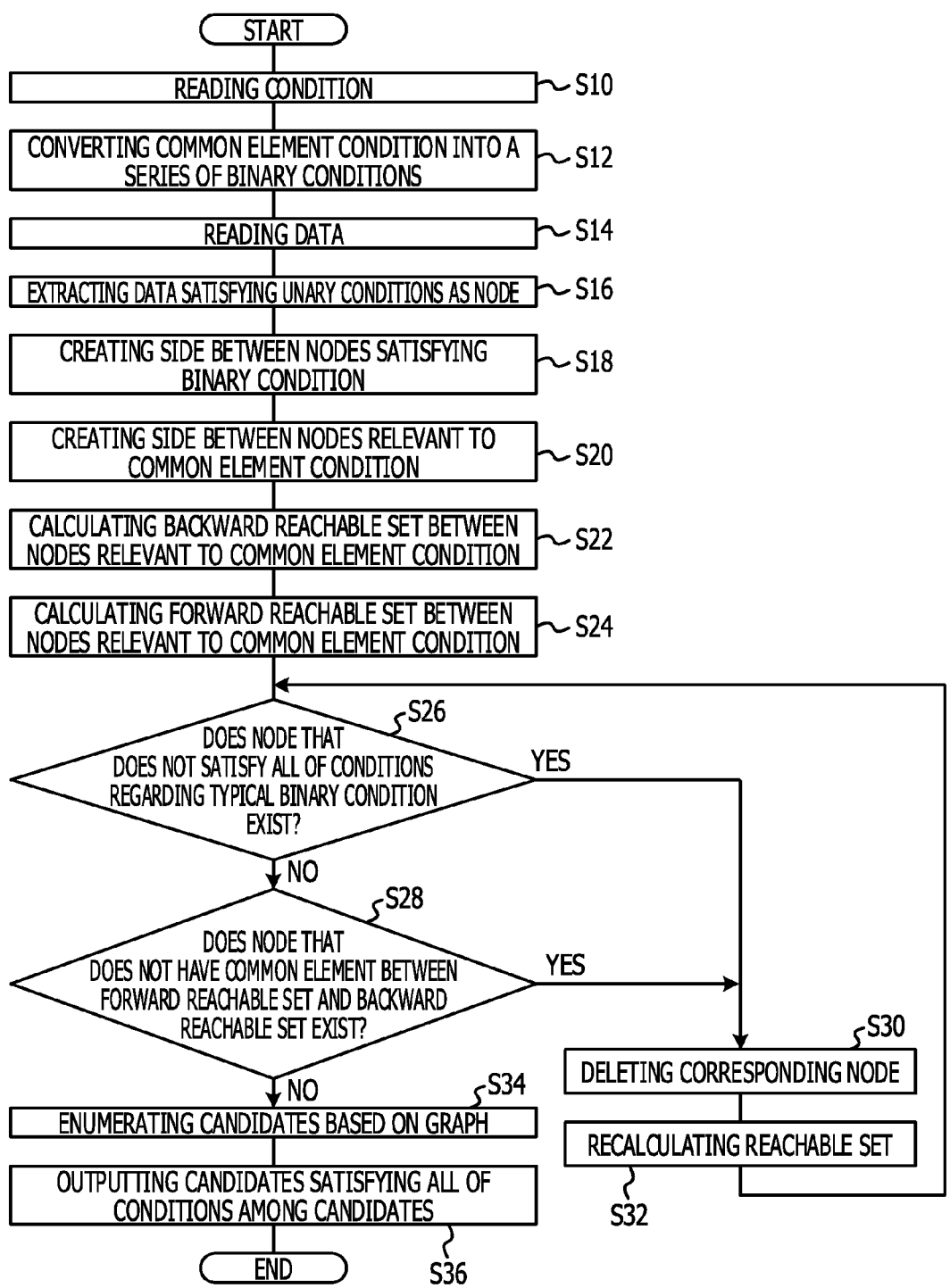
FIG. 4 illustrates an example of a process performed by a processing server.

FIG. 4 illustrates an example of process of a processing server. FIGS. 5A and 5B illustrate an example of the retrieval condition. The process illustrated in FIG. 4 may be performed after the retrieval condition is input from the client 50 (the input processing unit 52).

First, at Operation S10, the condition reading unit 12 of the processing server 10 reads the retrieval conditions input from the client 50 (the input processing unit 52). For example, the condition reading unit 12 may read the retrieval conditions illustrated in FIG. 5A. The processing server 10 retrieves a data combination of x, y and z satisfying the retrieval conditions illustrated in FIG. 5A and outputs the retrieved data combination to the client 50 (the display processing unit 54). Examples of the retrieval conditions of FIG. 5A may include unary conditions (1) to (3) (conditions on one data), a binary condition (4) (conditions on a relationship between two data) and a ternary condition (5) (conditions on a relationship between three data) as illustrated in FIG. 5B. For example, the ternary condition (5) is a common element condition that an element common to each attribute (manufacturing base) of a first data (x), a second data (y) and a third data (z) exists.

At Operation S12, the condition converting unit 14 converts the common element condition into a series of binary conditions. For example, the common element condition of "(5) There is a common place in manufacturing bases between x, y, z." may be converted into a binary condition that a common element exists in the attributes of two data, that is, the first data x and the second data y, and another binary condition that a common element exists in the attributes of two data, that is, the second data y and the third data z. For example, the common element condition may be divided into the binary conditions in a sequential order. When the common element condition is a n-ary condition on a relationship between n data, the common element condition may be converted (divided) into (n−1) conditions. For example, in FIG. 6, the binary condition after conversion is represented as "commonness (x-y manufacturing base)" and "commonness (y-z manufacturing base)".

At Operation S14, the data reading unit 18 reads data. For example, the data reading unit 18 may read data of the database illustrated in FIG. 7 from the data server 80.

Figures 8A, 8B:
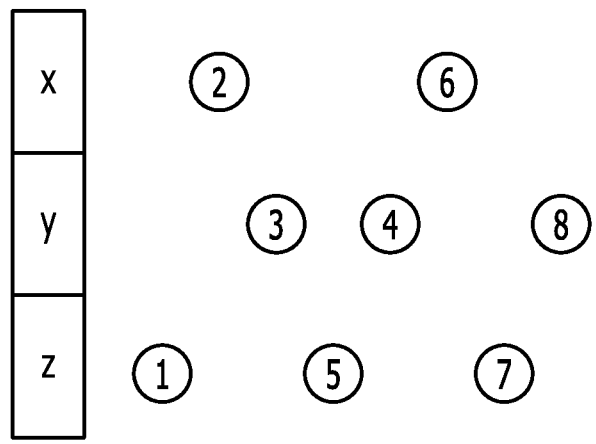
FIG. 8A and FIG. 8B illustrate an example of Operation S16.

At Operation S16, the graph generating unit 20 extracts data satisfying the unary condition and sets the extracted data as a node. FIG. 8A and FIG. 8B illustrate an example of Operation S16. For example, data (candidates of x, y and z) that satisfies unary conditions illustrated in bold in FIG. 8A, i.e., condition of "(1) Type of x is CPU", "(2) Type of y is MEM", or "(3) Type of z is HDD" is extracted from the database of FIG. 7 and is set as a node. As illustrated in FIG. 8B, data IDs of 2 and 6, data IDs of 3, 4 and 8, and data IDs of 1, 5 and 7 may be respectively extracted as candidates of x, candidates of y, and candidates of z and set the extracted data IDs as nodes.

Figure 9A:
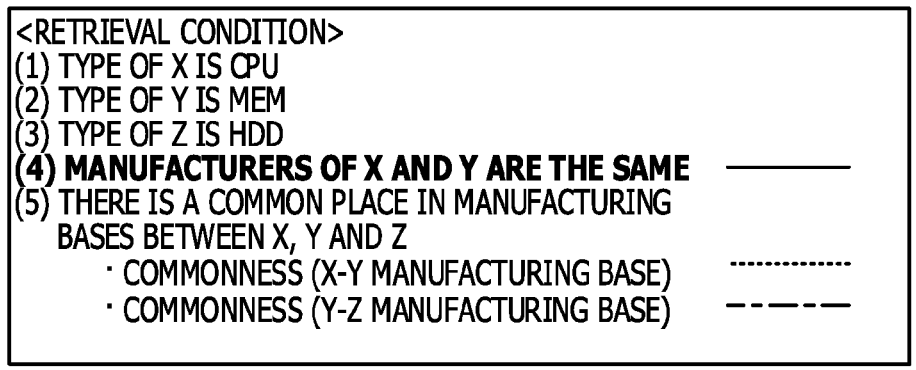
FIG. 9A, FIG. 9B and FIG. 9C illustrate an example of Operation S18 and Operation S20.
Figure 9B:
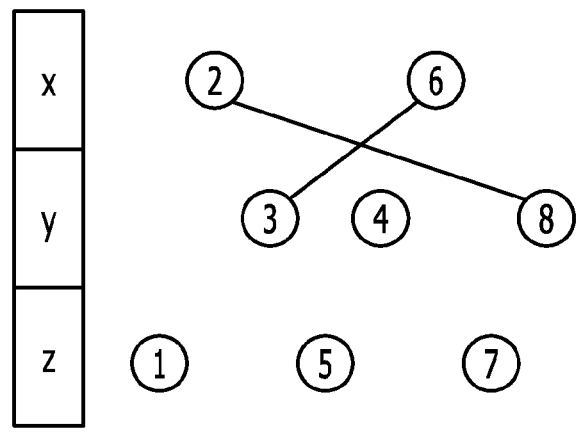
Figure 9C:
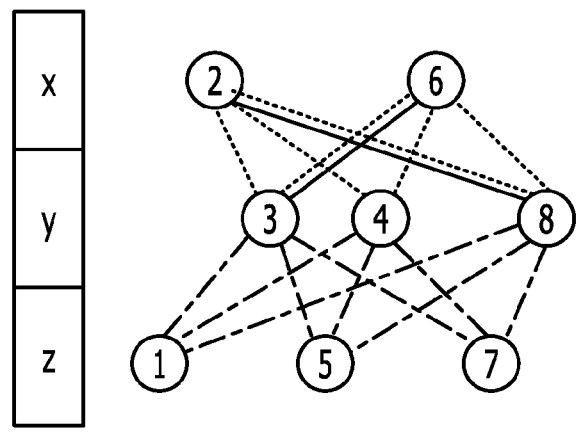

FIG. 9A, FIG. 9B and FIG. 9C illustrate an example of Operation S18 and Operation S20. At Operation S18, the graph generating unit S24 creates a side, for example, a link, between nodes satisfying the binary condition (except for the condition (5)). For example, the nodes satisfying the binary conditions are coupled with sides. The graph generating unit 20 couples the nodes satisfying binary conditions illustrated in bold in FIG. 9A, i.e., condition of "(4) Manufacturers of x and Y are the same." with the sides. FIG. 9B illustrates a state (graph) where nodes are coupled with sides having a solid line.

At Operation S20, the graph generating unit 20 creates sides between nodes related to the common element condition. For example, the graph generating unit 20 creates sides between nodes (x and y, y and z) related to the common element condition after conversion. FIG. 9C illustrates a state (graph) in which x and y are coupled with a broken line and y and z are coupled with alternate long and short dash lines.

Figure 10A:
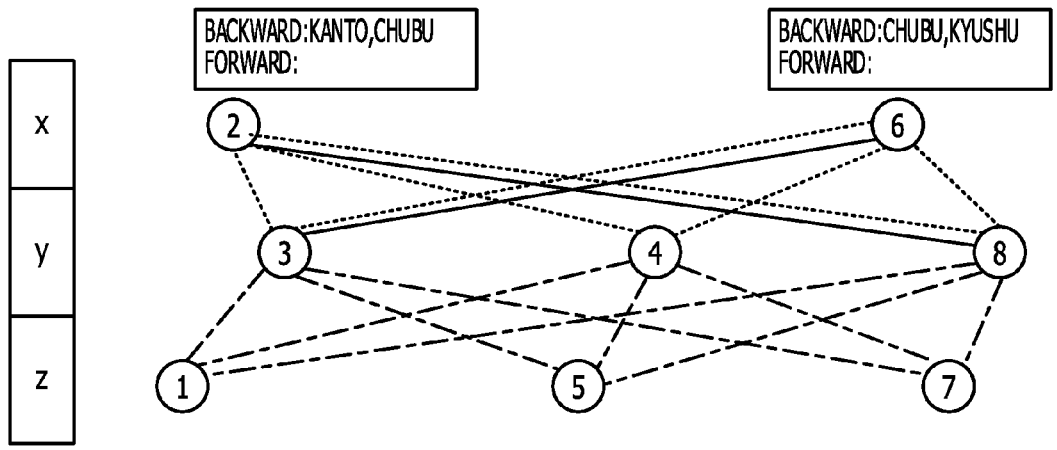
FIG. 10A, FIG. 10B and FIG. 10C illustrate an example of Operation S22.
Figure 10B:
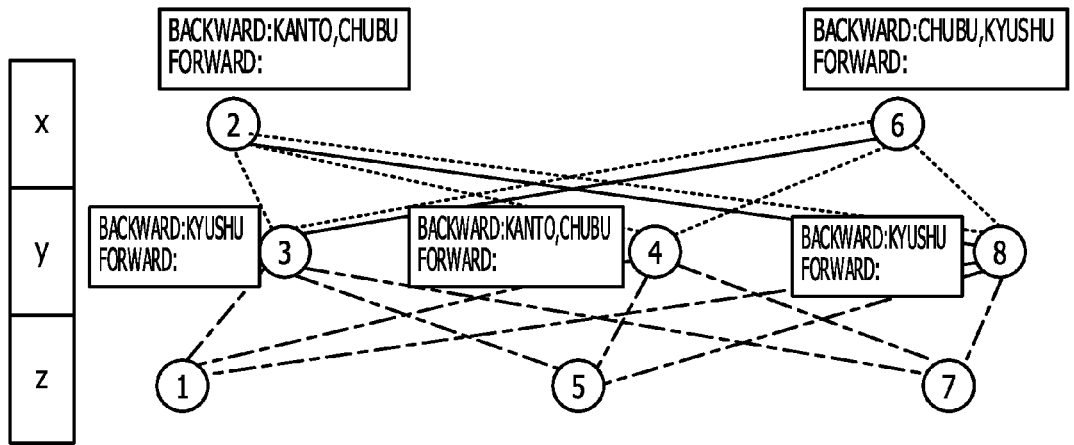
Figure 10C:
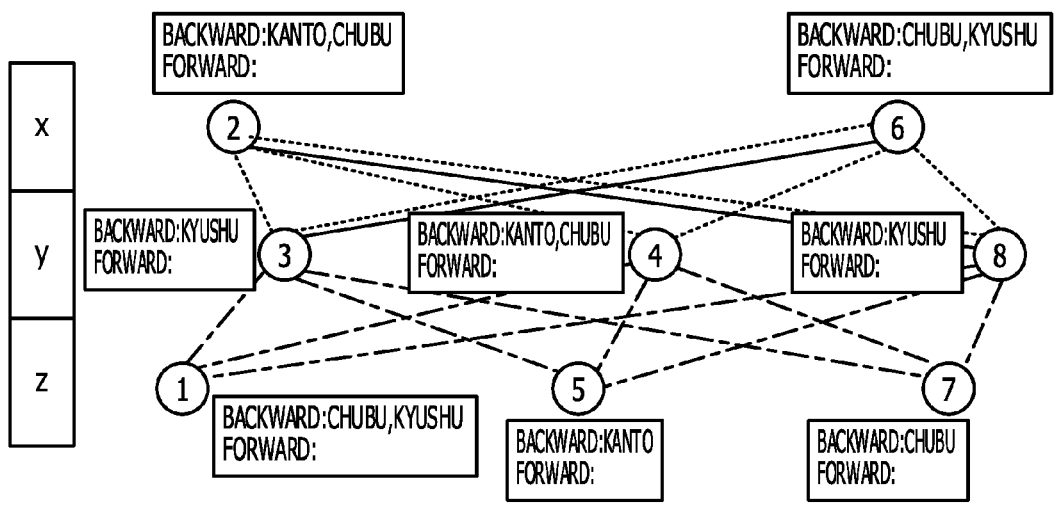

At Operation S22, the reachable set calculation unit 28 calculates a backward reachable set of a node related to the common element condition. The backward reachable set may be a set of elements satisfying the condition before conversion which is obtained from among elements included in the attribute of each node, for example, the manufacturing base with respect to a reverse direction to a sequential order of dividing the common element. For example, the reachable set calculation unit 28 may obtain a product set of a summed set of the backward reachable sets of the node before one step, which is linked to its own node, and a set of elements of its own node. FIG. 10A, FIG. 10B and FIG. 10C illustrates an example of Operation S22. At Operation S22, for example, as illustrated in FIG. 10A, the reachable set calculation unit 28 sets all the elements included in the manufacturing base of the x node (data ID=2,6) as the backward reachable set. In FIG. 10A, the backward reachable set of data ID=2 node may be "Kanto, Chubu" and the backward reachable set of data ID=6 node may be "Chubu, Kyushu".

The reachable set calculation unit 28 sets the manufacturing base of the y node (data ID=3,4,8) that matches with any one of the backward reachable sets of the x node (data ID=2,6) as the backward reachable set of each y node, among manufacturing bases of the y node (data ID=3,4,8). For example, as illustrated in FIG. 10B, when a node is the node having data ID=3, among manufacturing bases (Tohoku, Kyushu) of data ID=3, "Kyushu" which matches with any one of the backward reachable set (Kanto, Chubu) of data ID=2 and the backward reachable set (Chubu, Kyushu) of data ID=6 may be set as the backward reachable set of data ID=3. The backward reachable set of data ID=4,8 may also be set in a substantially similarly to the way which sets the backward reachable set of data ID=3.

The reachable set calculation unit 28 sets the manufacturing base of the z node (data ID=1,5,7) that matches with any one of the backward reachable sets of the y node (data ID=3,4,8) as the backward reachable set of each z node, among manufacturing bases of the z node (data ID=1,5,7). For example, the backward reachable set of each z node may be set as illustrated in FIG. 10C.

Figure 11A:
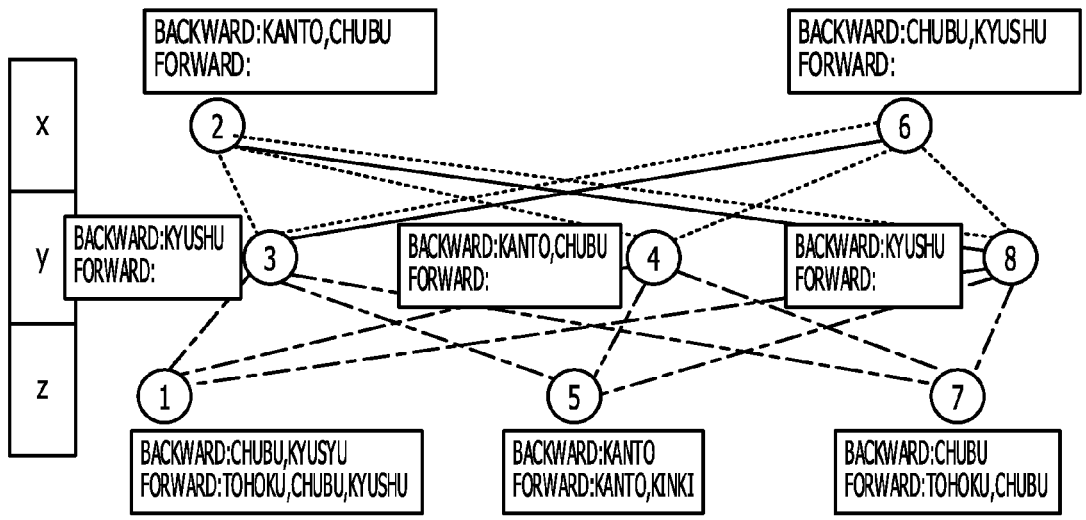
FIG. 11A, FIG. 11B and FIG. 11C illustrate an example of Operation S24.
Figure 11B:
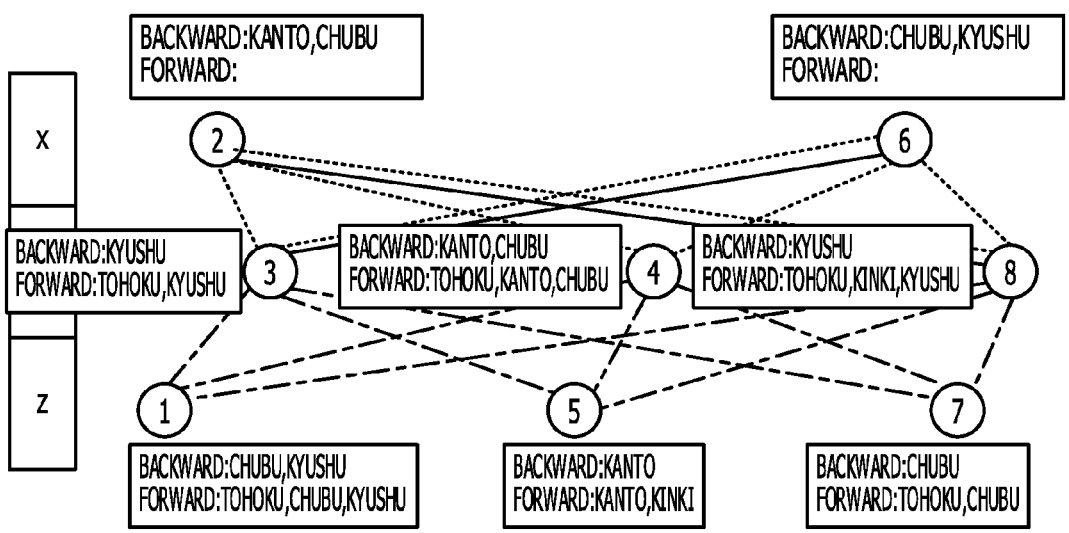
Figure 11C:
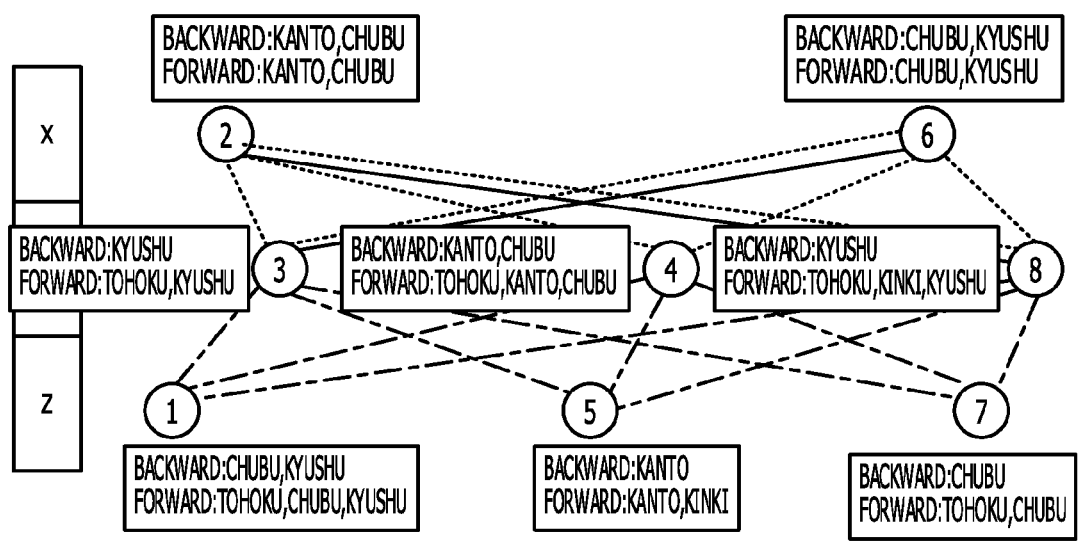

At Operation S24 illustrated in FIG. 4, the reachable set calculation unit 28 calculates a forward reachable set of a node related to the common element condition. FIG. 11A, FIG. 11B and FIG. 11C illustrates an example of Operation S24. For example, as illustrated in FIG. 11A, the reachable set calculation unit 28 sets all the elements included in the manufacturing base of the z node (data ID=1,5,7) as the forward reachable set. The reachable set calculation unit 28 sets the manufacturing base of the y node (data ID=3,4,8) that matches with any one of the backward reachable sets of the z node (data ID=1,5,7) as a forward reachable set of each y node, among manufacturing bases of the y node (data ID=3,4,8). For example, as illustrated in FIG. 11B, when a node is the node having data ID=3, among manufacturing bases (Tohoku, Kyushu) of data ID=3, "Tohoku, Kyushu" which matches with any one of the forward reachable set (Tohoku, Chubu, Kyushu) of data ID=1, the forward reachable set (Kanto, Kinki) of data ID=5 and the forward reachable set (Tohoku, Chubu) of data ID=7 may be set as the forward reachable set of data ID=3. The forward reachable set of data ID=4,8 may also be set in a substantially similarly to the way which sets the forward reachable set of data ID=3. The reachable set calculation unit 28 sets the manufacturing base of the x node (data ID=2,6) that matches with any one of the forward reachable sets of the y node (data ID=3,4,8) as a forward reachable set of each x node, among manufacturing bases of the x node (data ID=2,6). For example, each forward reachable set of the x node may be set as illustrated in FIG. 11C.

Figure 12:
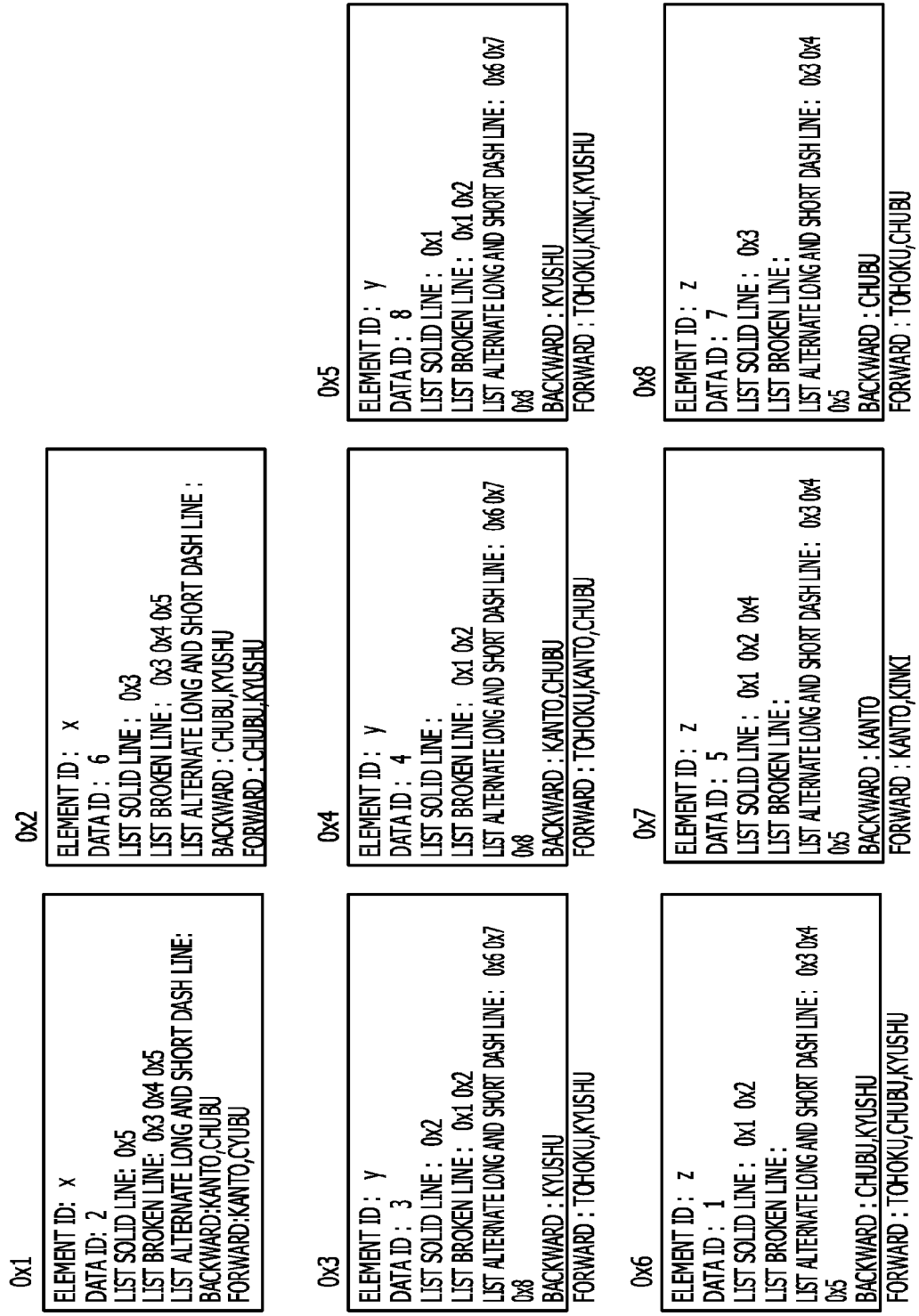
FIG. 12 illustrates an example of a data format of a graph.

For example, after the graph and the backward reachable set and the forward reachable set illustrated in FIG. 11C are created (calculated), the graph preserving unit 22 may store the graph and the backward reachable set and the forward reachable set in the graph storage unit 30. FIG. 12 illustrates an example of a data format of a graph. The data format illustrated in FIG. 12 may be stored in the graph storage unit. The graph preserving unit 22 may store the backward reachable set and the forward reachable set illustrated in FIG. 11C in a data structure illustrated in FIG. 12. For example, when a node is deleted in the process of deleting the node from the graph, the data structure may be a data structure through which information of a related side and information of a node coupled to the node to be deleted with a side are efficiently accessible. For example, as illustrated in FIG. 12, data of nodes are assigned with addresses, 0x1, 0x2, . . . . Data of each node may have items of element ID, data ID, list solid line, list dashed line, list alternate long and short dash line, forward and backward. One of x, y and z may be stored in the element ID item and an ID of data itself may be stored in the data ID item. Addresses of nodes coupled with sides may be stored in the list solid line item, the list dashed line item and the list alternate long and short dash line item. The backward reachable set may be stored in the backward item and the forward reachable set may be stored in the forward item.

At Operation S26 illustrated in FIG. 4, the node deleting unit 24 determines whether a node that does not satisfy all the conditions for a typical binary condition, for example, the condition (4) exists. When it is determined that the determination result at Operation S26 is "NO", the process proceeds to Operation S28. At Operation S28, the node deleting unit 24 determines whether a node that does not have the common element in the forward reachable set and the backward reachable set exists. When it is determined that any one of the determination results at Operation S26 and Operation S28 is "YES", Operation S30 and Operation S32 are executed, and the process goes back to Operation S26. For example, Operation S30 and Operation S32 may be repeated as long as any one of the determination results at Operation S26 and Operation S28 is "YES".

Figure 13A:
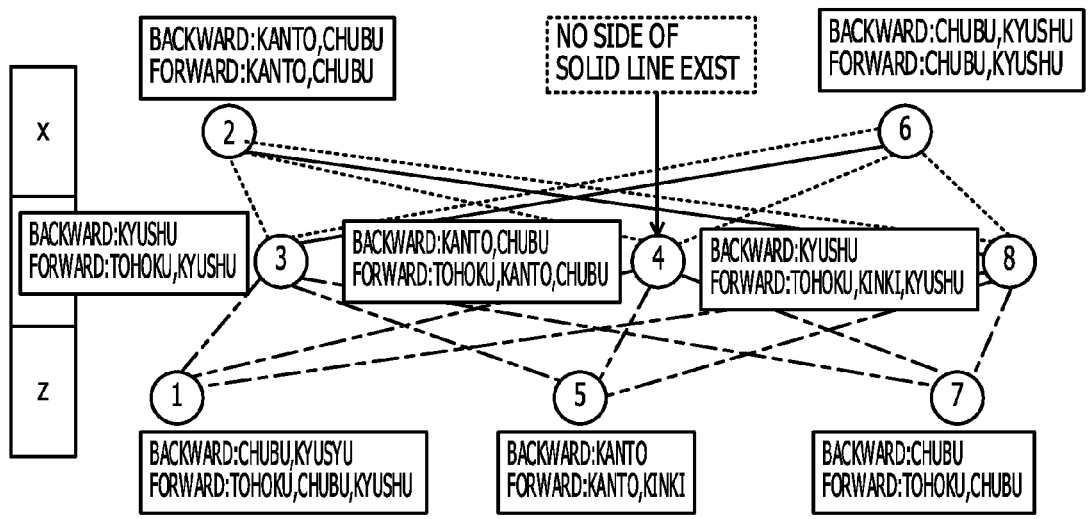
FIG. 13A, FIG. 13B and FIG. 13C illustrate an example of a loop formed of Operation S26 to Operation S32.
Figure 13B:
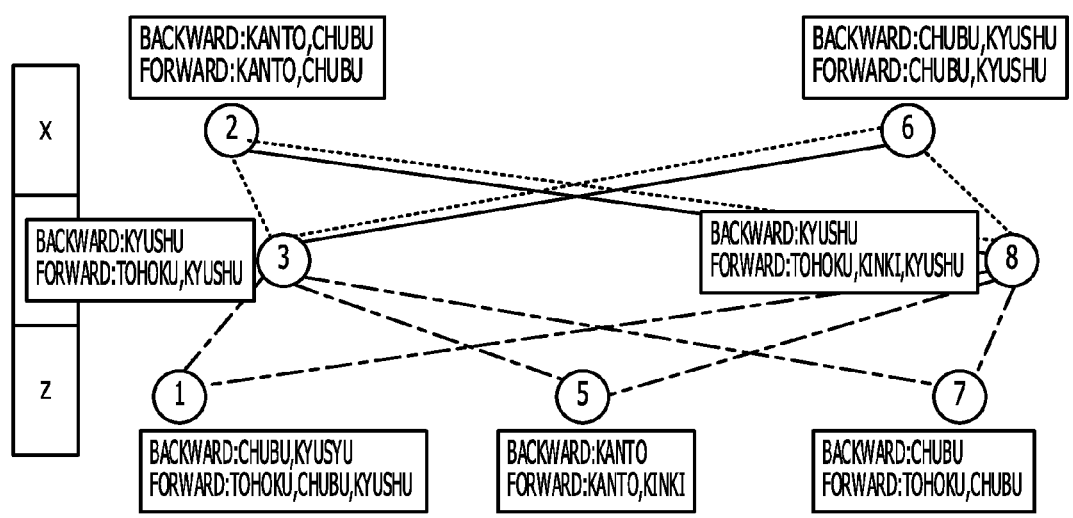
Figure 13C:
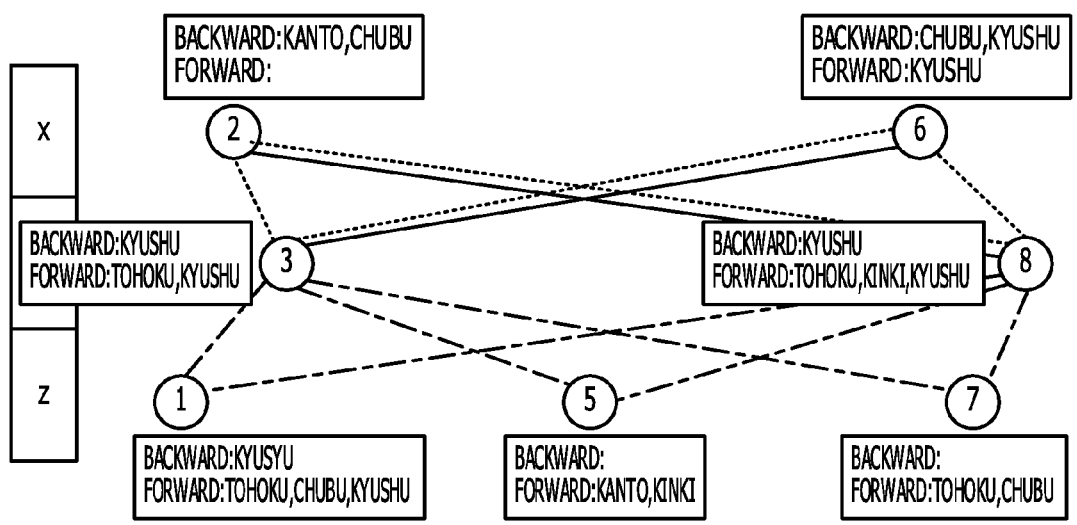
Figure 14A:
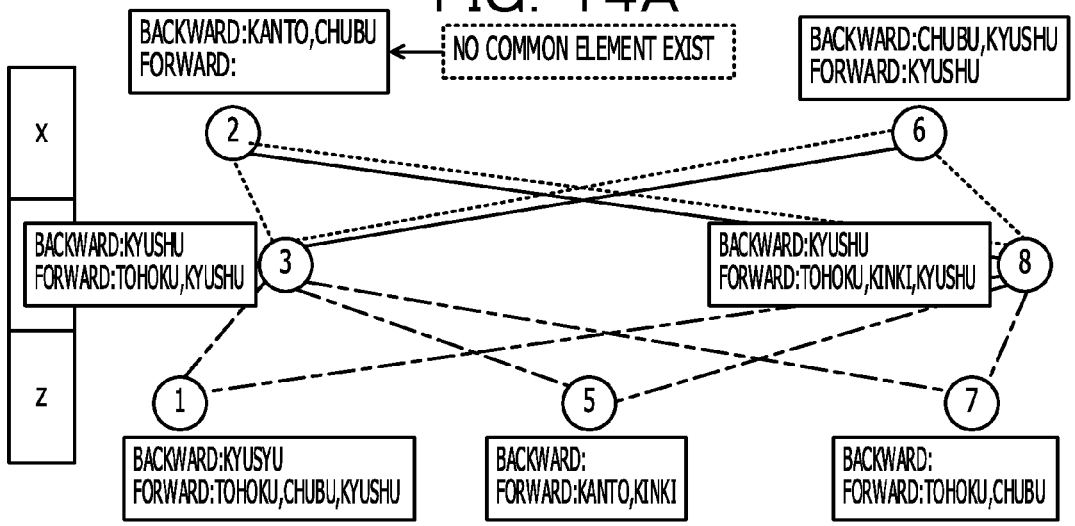
FIG. 14A, FIG. 14B and FIG. 14C illustrate another example of a loop formed of Operation S26 to Operation S32.
Figure 14B:
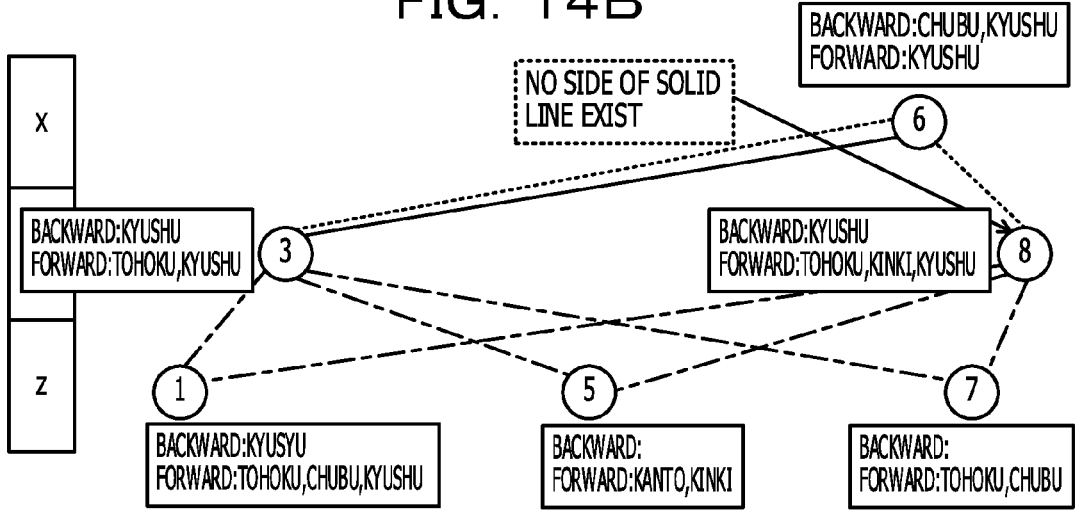
Figure 14C:
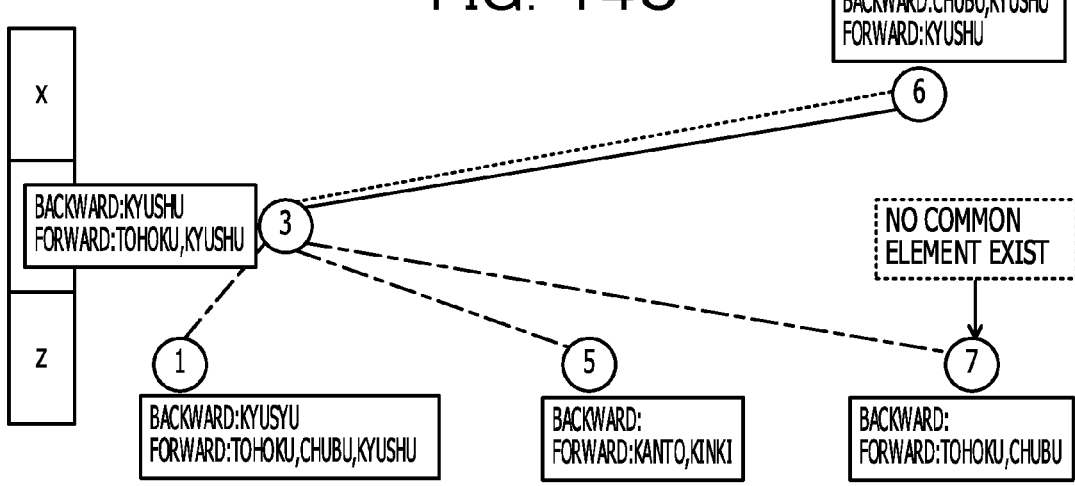
Figure 15A:
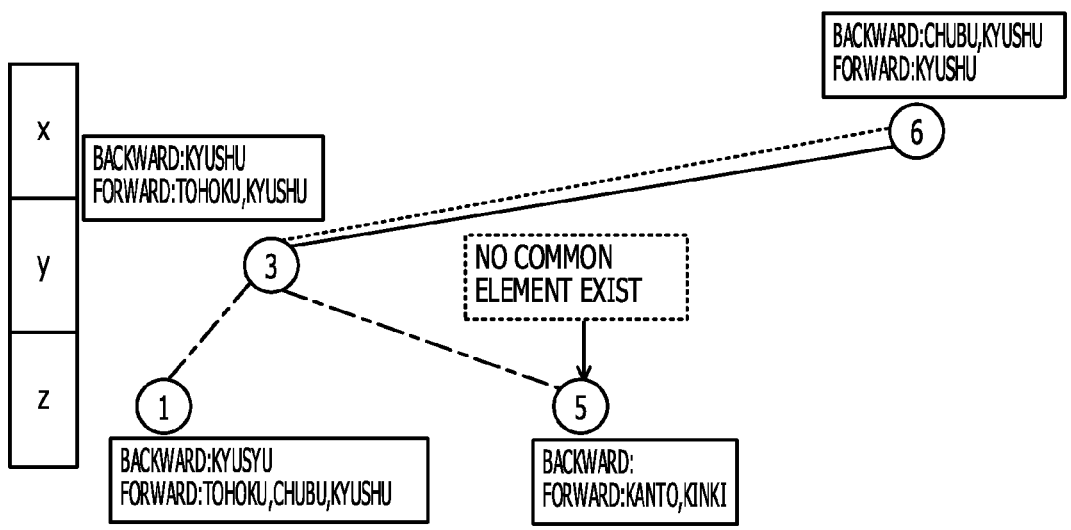
FIG. 15A and FIG. 15B illustrate still another example of a loop formed of Operation S26 to Operation S32.
Figure 15B:
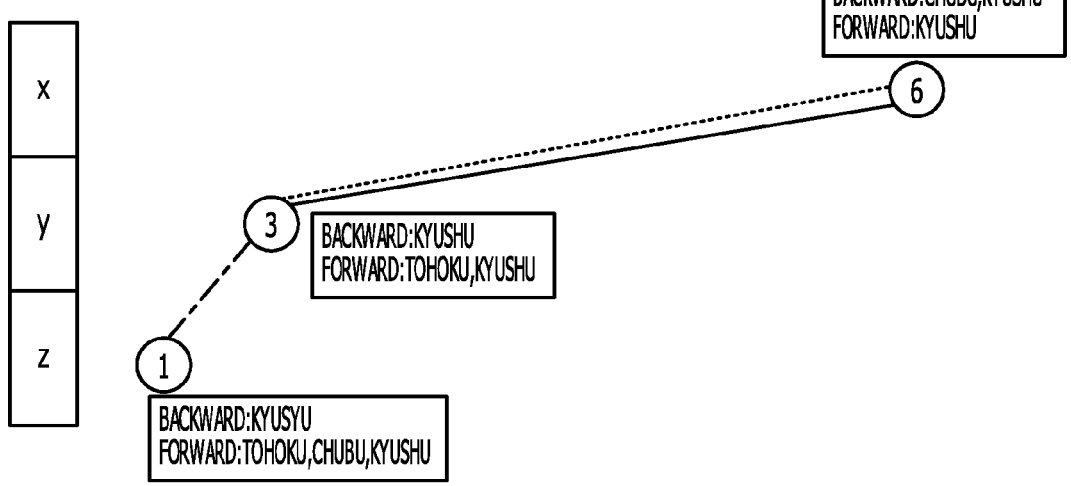
Figure 16:
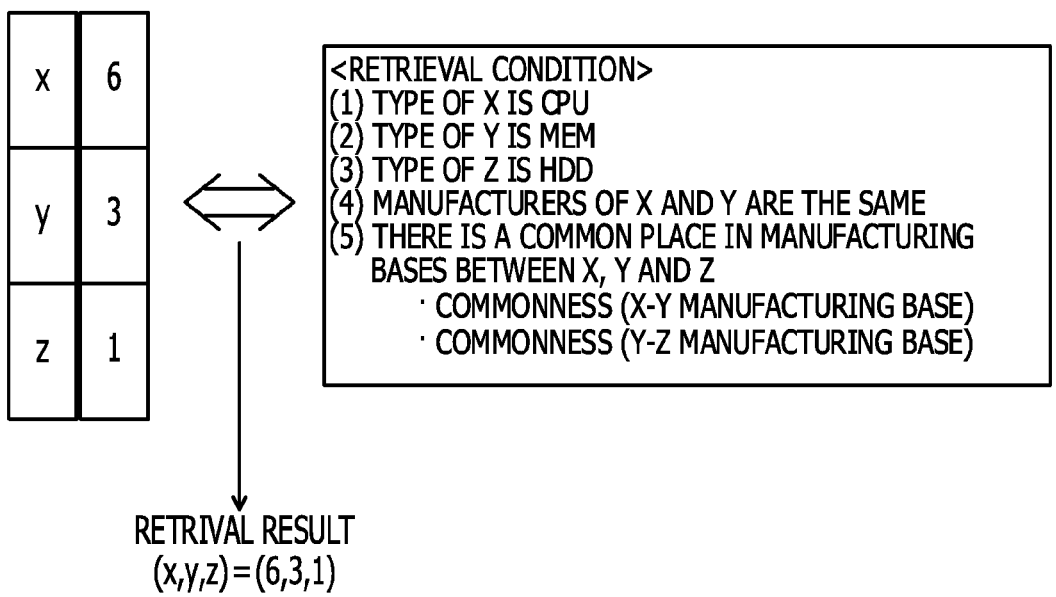
FIG. 16 illustrates an example of Operation S36.

At Operation S30, the node deleting unit 24 may delete a certain node, for example, a node which has a factor causing the determination results at Operation S26 and Operation S28 to be "YES". At Operation S32, the reachable set calculation unit 28 recalculates the reachable set. FIG. 13A, FIG. 13B and FIG. 13C illustrate an example of a loop formed of Operation S26 to Operation S32. FIG. 14A, FIG. 14B and FIG. 14C illustrate another example of a loop formed of Operation S26 to Operation S32. FIG. 15A and FIG. 15B illustrate still another example of a loop formed of Operation S26 to Operation S32.

In the graph of FIG. 11C, the side of solid line is not coupled to a node having data ID=4 as illustrated by a broken line frame in FIG. 13A. For example, the node having data ID=4 does not satisfy the condition (4) (the determination result at Operation S26 is "YES") and thus, the node deleting unit 24 deletes the node having data ID=4 (S30). The reachable set calculation unit 28 recalculates the reachable set (S32). For example, the node deleting unit 24 deletes data of a node having an address of 0x4 illustrated in FIG. 12 and also deletes the node having the address of 0x4 from a list of other nodes. The reachable set calculation unit 28 updates the backward reachable set and the forward reachable set of the other node which are influenced by deletion of the node having data ID=4 from the graph. Therefore, the reachable set illustrated in FIG. 13C is recalculated.

In a state of FIG. 13C, as illustrated by the broken line frame of FIG. 14A, the common element does not exist in the forward reachable set and the backward reachable set of a node having data ID=2 (the determination result at Operation S28 is "YES"). Therefore, the node deleting unit 24 deletes the node having data ID=2 (S30). The reachable set calculation unit 28 recalculates the reachable set (S32).

In a state of FIG. 14B, the side of the solid line is not coupled to a node having data ID=8 (the determination result at Operation S26 is "YES"), the node deleting unit 24 deletes the node having data ID=8 (S30). The reachable set calculation unit 28 recalculates the reachable set (S32, see FIG. 14C).

In a state of FIG. 14C, the common element does not exist in the forward reachable set and the backward reachable set of a node having data ID=7 (the determination result at Operation S28 is "YES") and thus, the node deleting unit 24 deletes the node having data ID=7 (S30). The reachable set calculation unit 28 recalculates the reachable set (S32, see FIG. 15A).

In a state of FIG. 15A, the common element does not exist in the forward reachable set and the backward reachable set of a node having data ID=5 (the determination result at Operation S28 is "YES") and thus, the node deleting unit 24 deletes the node having data ID=5 (S30). The reachable set calculation unit 28 recalculates the reachable set (S32, see FIG. 15B).

When the graph and the reachable set are arranged as illustrated in FIG. 15B, the determination result at Operation S26 and Operation S28 illustrated in FIG. 4 becomes "NO". The process proceeds to Operation S34. The output generating unit 26 enumerates combination candidates of data based on the graph stored in the graph storing unit 30, for example, the graph in which all the nodes to be deleted are deleted. For example, a single combination of (x, y, z)=(6, 3,1) left in the graph illustrated in FIG. 15B may be enumerated as a combination candidate.

At Operation S36, the output generating unit 26 outputs the combination which satisfies the retrieval conditions among the enumerated combination candidates to the client 50, for example, the display processing unit 54. For example, the output generating unit 26 determines whether or not the combination candidate satisfies all conditions (1) to (5) and outputs the combination when the combination candidate satisfies all conditions (1) to (5). The combination candidates (6, 3, 1) satisfying the retrieval condition satisfies all the retrieval conditions and thus, the output generating unit 26 may output the combination candidates (6, 3, 1) to the display processing unit 54. Upon receiving the data combination from the output generating unit 26, the display processing unit 54 displays (x, y, z)=(6, 3, 1) as a result of retrieval on the display 193 of the client 50.

The condition converting unit 14 divides the common element condition, for example, "There is a common place in manufacturing bases between x, y, z." in a sequential order to create a binary conditions that the common element exists between attributes of x and y and between attributes of y and z (S12). The graph generating unit 20 creates the graph based on a unary condition and a binary condition (S16 to S20). The output generating unit 26 determines (S34) the combination candidate of data based on the graph created by repeatedly calculating (S22, S24, S32) the backward reachable set and the forward reachable set by the reachable set calculation unit 28 and deleting (S30) the node that does not have an element common to the backward reachable set and the forward reachable set by the node deleting unit 24 until the node to be deleted by the node deleting unit 24 does not exist. The combination, which satisfies the common element condition from the combination candidates, is output to the client 50 (display processing unit 54) based on the common element condition (S36). The processes such as deleting of the node that does not have an element common to the backward reachable set and the forward reachable set, recalculating of the backward reachable set and the forward reachable set in the graph in which the node is deleted and deleting of the node are repeatedly performed to narrow the data combination candidates. The output generating unit 26 finds out and outputs the combination which satisfies the condition among the combination candidates after being narrowed. Therefore, a combination of data which satisfies the condition may be found for a short time as compared to a case where the combination of data which satisfies the condition are retrieved among the all data combinations.

When the node that does not satisfy the typical binary condition (the condition such as the condition (4) of FIG. 5A)) included in the retrieval condition is included (the determination result at Operation S28 is "YES"), the node deleting unit 24 deletes the node and thus, the combinations of data that satisfy the retrieval condition may also be narrowed due to the deletion.

As illustrated in FIG. 9B, when the node (data ID=4) that is not coupled with the side of the solid line exists, the backward reachable set or the forward reachable set of the node may be calculated. For example, when the node (data ID=4) that is not coupled with the side of the solid line exists, the backward reachable set or the forward reachable set of each node may be calculated in the graph in which the node is deleted.

A ternary condition, for example, "Vendors of x, y and z are the same" may be included in the retrieval condition. In this case, the condition converting unit 14 may converts the ternary condition into the binary conditions such as "Vendors of x and y are the same", "Vendors of y and z are the same" and "Vendors of z and x are the same". When a redundant condition, such as a transitive condition or a duplicate condition, is included in the binary condition after conversion, the condition converting unit 14 may delete the condition. For example, the condition converting unit 14 may delete any one of the "Vendors of x and y are the same", "Vendors of y and z are the same" and "Vendors of z and x are the same".

The common element condition may be a ternary condition. The common element condition may be a n-ry condition (n is an integer number of 3 (three) or more).

A unary condition may be included in the retrieval condition illustrated in FIG. 5A. When the unary condition is not included in the retrieval condition, all of data may be set as the x node, the y node or the z node.

When a plurality of common element conditions are included in the retrieval condition, a plurality of sets of conditions that are divided in a sequential order may be created.

The above-described processes may be performed by a computer. Programs describing the contents of functions of a processing apparatus may be provided. The programs may be executed by the computer so as to implement the functions of the processing apparatus on the computer. The programs describing the processing contents may be recorded on a computer-readable recording medium (except a carrier wave).

The programs may be provided in the form of a portable recording medium such as a Digital Versatile Disc (DVD) or Compact Disc Read Only Memory (CD-ROM), in which the program is recorded. The programs may be stored in a storage device of a server computer and may be transmitted from the server computer to another computer via a network.

A computer executing the programs stores the programs recorded on the portable recording medium or the programs transmitted from the server computer in its own storage device. The computer may read the programs from its own storage device and execute processes according to the programs. The computer may execute the programs directly read from the portable recording medium. The computer may execute processes according to the programs received whenever the programs are transmitted from the server computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A data output method comprising:
generating, by a computer, (n−1) first conditions (n is an integer number of three or more) on a relationship between two data by dividing, in a sequential order, a common element condition in which an attribute of each of n data includes a common element and which is included in a plurality of conditions;
extracting a plurality of second data satisfying respective second conditions on one data among the plurality of conditions, from a plurality of first data, as nodes;
extracting, from the nodes, combinations of two nodes satisfying the respective first conditions;
creating a first graph by coupling the two nodes of each of the combinations with links;
creating a second graph by deleting a node which does not include a common element between a first set of elements obtained by tracing the links in a first direction and a second set of elements obtained by tracing the links in a second direction opposite to the first direction;
determining candidates of a combination of data from the second graph; and
outputting a combination of data satisfying the common element condition from the candidates of a combination of data.

2. The data output method according to claim 1, wherein the deleting is performed until a node to be deleted does not exist.

3. The data output method according to claim 1, further comprising:
extracting, from the nodes, combinations of two nodes satisfying respective third conditions on a relationship between two data among the plurality of conditions; and
deleting a node that does not satisfy one of the third conditions.

4. The data output method according to claim 1, wherein the first set of elements is obtained by acquiring a product set between elements of one or more nodes linked with an own node in a first direction and elements of the own node, and the second set of elements is obtained by acquiring a product set between elements of one or more nodes linked with the own node in a second direction opposite to the first direction and elements of the own node.

5. A computer-readable recording medium storing a data output program for causing a computer to execute operations of:
generating (n−1) first conditions (n is an integer number of three or more) on a relationship between two data by dividing, in a sequential order, a common element condition in which an attribute of each of n data includes a common element and which is included in a plurality of conditions;
extracting a plurality of second data satisfying respective second conditions on one data among the plurality of conditions, from a plurality of first data, as nodes;
extracting, from the nodes, combinations of two nodes satisfying the respective first conditions;
creating a first graph by coupling the two nodes of each of the combinations with links;
creating a second graph by deleting a node which does not include a common element between a first set of elements obtained by tracing the links in a first direction and a second set of elements obtained by tracing the links in a second direction opposite to the first direction;
determining candidates of a combination of data from the second graph; and outputting a combination of data satisfying the common element condition from the candidates of a combination of data.

6. The computer-readable recording medium according to claim 5, wherein the deleting is performed until a node to be deleted does not exist.

7. The computer-readable recording medium according to claim 5, further comprising:
   extracting, from the nodes, combinations of two nodes satisfying respective third conditions on a relationship between two data among the plurality of conditions; and
   deleting a node that does not satisfy one of the third conditions.

8. The computer-readable recording medium according to claim 5, wherein the first set of elements is obtained by acquiring a product set between elements of one or more nodes linked with an own node in a first direction and elements of the own node, and the second set of elements is obtained by acquiring a product set between elements of one or more nodes linked with the own node in a second direction opposite to the first direction and elements of the own node.

9. A data output system, comprising:
   a memory configured to store a data output program:
   a computer processing unit configured to execute a program to perform operations of:
      generating (n−1) first conditions (n is an integer number of three or more) on a relationship between two data by dividing, in a sequential order, a common element condition in which an attribute of each of n data includes a common element and which is included in a plurality of conditions;
      extracting a plurality of second data satisfying respective second conditions on one data among the plurality of conditions, from a plurality of first data, as nodes;
      extracting, from the nodes, combinations of two nodes satisfying the respective first conditions;
      creating a first graph by coupling the two nodes of each of the combinations with links;
      creating a second graph by deleting a node which does not include a common element between a first set of elements obtained by tracing the links in a first direction and a second set of elements obtained by tracing the links in a second direction opposite to the first direction;
      determining candidates of a combination of data from the second graph; and
      outputting a combination of data satisfying the common element condition from the candidates of a combination of data.

10. The data output system according to claim 9, wherein the deleting is performed until a node to be deleted does not exist.

11. The data output system according to claim 9, further comprising:
   extracting, from the nodes, combinations of two nodes satisfying respective third conditions on a relationship between two data among the plurality of conditions; and
   deleting a node that does not satisfy one of the third conditions.

12. The data output system according to claim 9, wherein the first set of elements is obtained by acquiring a product set between elements of one or more nodes linked with an own node in a first direction and elements of the own node, and the second set of elements is obtained by acquiring a product set between elements of one or more nodes linked with the own node in a second direction opposite to the first direction and elements of the own node.

* * * * *